(12) United States Patent
Wu et al.

(10) Patent No.: US 7,170,671 B2
(45) Date of Patent: Jan. 30, 2007

(54) HIGH EFFICIENCY WAVELENGTH CONVERTERS

(75) Inventors: Shang-Yi Wu, Jhongli (TW); Vivien Tsai, Hsinchu (TW); Ming-Hsien Chou, Holmdel, NJ (US)

(73) Assignee: HC Photonics Corporation, Hsin-Chu (TW)

( * ) Notice: Subject to any disclaimer, the term of this patent is extended or adjusted under 35 U.S.C. 154(b) by 137 days.

(21) Appl. No.: 10/925,303

(22) Filed: Aug. 24, 2004

(65) Prior Publication Data

US 2006/0044644 A1    Mar. 2, 2006

(51) Int. Cl.
  *G02F 1/365*    (2006.01)
  *G02F 1/355*    (2006.01)
  *C30B 33/00*    (2006.01)

(52) U.S. Cl. ............................ 359/332; 385/122; 117/3
(58) Field of Classification Search ........ 359/326–332; 385/122; 117/3
  See application file for complete search history.

(56) References Cited

U.S. PATENT DOCUMENTS

| | | | |
|---|---|---|---|
| 4,820,011 A | 4/1989 | Umegaki et al. ............. 385/37 |
| 4,946,240 A | 8/1990 | Yamamoto et al. .......... 359/328 |
| 4,952,013 A | 8/1990 | Harada et al. .............. 359/328 |
| 5,205,904 A | 4/1993 | Yamamoto et al. ............. 216/24 |
| 5,313,543 A | 5/1994 | Matsuda et al. ............. 385/122 |
| 5,436,757 A | 7/1995 | Okazaki et al. ............. 359/332 |
| 5,515,471 A | 5/1996 | Yamamoto et al. ......... 385/122 |
| 5,872,884 A | 2/1999 | Mizuuchi et al. ........... 385/130 |
| 6,195,198 B1 | 2/2001 | Hatori ........................ 359/332 |
| 6,295,159 B1* | 9/2001 | Lung-Han et al. .......... 359/326 |
| 6,363,189 B1 | 3/2002 | Minakata et al. ............. 385/41 |
| 6,519,077 B1 | 2/2003 | Mizuuchi et al. ........... 359/332 |
| 2002/0179912 A1* | 12/2002 | Batchko et al. ............... 257/79 |
| 2003/0127042 A1* | 7/2003 | Tsou et al. ..................... 117/3 |

OTHER PUBLICATIONS

Korkishko et al, "Reverse Proton Exchange For Buried Waveguides In LiNbO3", J. Opt. Soc. Am. A, vol. 15, No. 7, Jul. 1998, pp. 1838-1842.*
"Reverse Exchange Method for Burying Proton Exchanged Waveguides", by J. L. Jackel et al., Electronics Letters, Jul. 18, 1991, vol. 27, No. 15, pp. 1360-1361.

* cited by examiner

*Primary Examiner*—John D. Lee
(74) *Attorney, Agent, or Firm*—Saile Ackerman LLC; Stephen B. Ackerman

(57) ABSTRACT

A method is provided for forming a waveguide region within a periodically domain reversed ferroelectric crystal wherein the waveguide region has a refractive index profile that is vertically and horizontally symmetric. The symmetric profile produces effective overlapping between quasi-phase-matched waves, a corresponding high rate of energy transfer between the waves and a symmetric cross-section of the radiated wave. The symmetric refractive index profile is produced by a method that combines the use of a diluted proton exchange medium at a high temperature which produces a region of high index relatively deeply beneath the crystal surface, followed by a reversed proton exchange which restores the original crystal index of refraction immediately beneath the crystal surface.

22 Claims, 5 Drawing Sheets

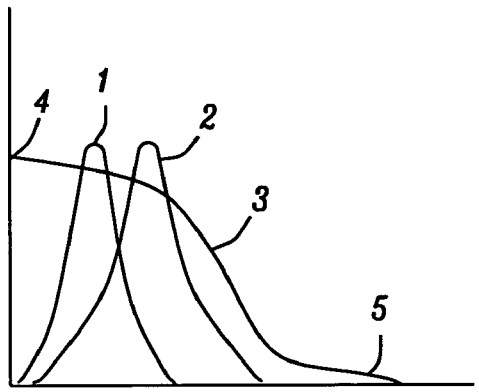
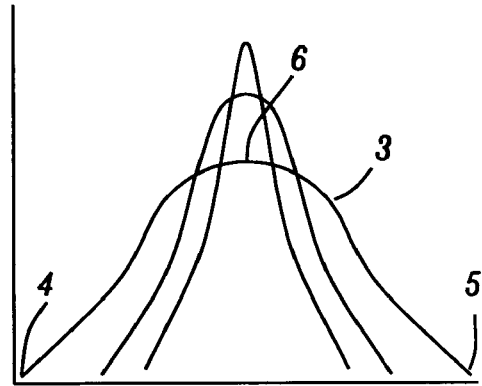
FIG. 1a    FIG. 1b
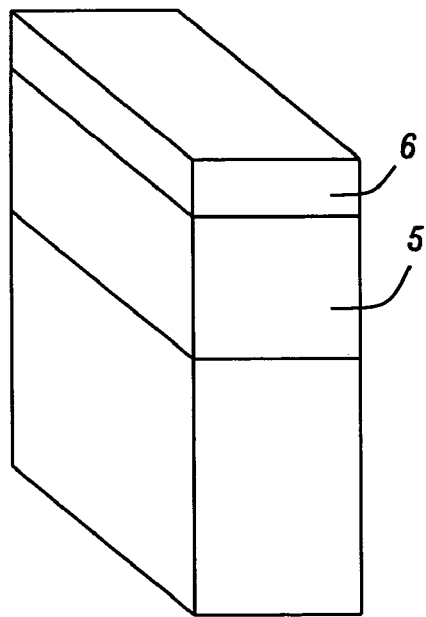
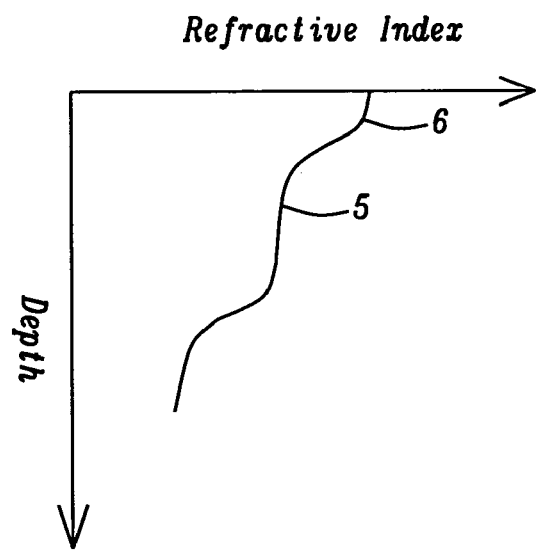
FIG. 2 – Prior Art

HIGH EFFICIENCY WAVELENGTH CONVERTERS

BACKGROUND OF THE INVENTION

1. Field of the Invention

This invention relates to the fabrication of high efficiency wavelength converters and their application in the field of nonlinear optical frequency conversion.

2. Description of the Related Art

Nonlinear frequency conversion provides a valuable tool for the generation of laser radiation in spectral ranges that are difficult if not impossible to obtain by conventional laser sources. Ferroelectric crystals (crystals having nonlinear polarizations) such as $LiNbO_3$ or $LiTaO_3$ or such crystals doped with MgO or ZnO are attractive candidates for use in such applications. Early attempts to use such crystals as a means for doubling the frequency of an incoming wave of optical radiation have shown that it is necessary to confine the incoming wave within an optical waveguide in order to maximize the conversion efficiency of the doubling process. Umegaki et al. (U.S. Pat. No. 4,820,011) form a waveguide by depositing nonlinear optical material between two glass substrates disposed facing each other. The frequency doubling conversion is produced by a Cherenkov type effect and at least one of the substrates is provided with a grating structure for permitting entry of the fundamental wave. The method of Umegaki is mentioned herein for purposes of historical completeness as the more recent approaches, particularly that of the present invention, produce frequency conversion within a ferroelectric crystal having disposed therein periodic regions of dipole moment domain inversion.

Since the frequency conversion method of the present invention, as well as related prior art methods, takes as a starting point a nonlinear ferroelectric crystal within which there has been formed a periodic configuration of domain reversed regions, a few words of explanation will be provided as to the properties of such a crystal. Ferroelectric materials have internal electric dipole moments which can be made to manifest themselves spontaneously on a macroscopic domain scale without the presence of external electric fields (hence the term "ferroelectric" by analogy with "ferromagnetic" for materials with domain scale magnetic dipole moments). These macroscopic polarizations are responsible for the optical properties of the materials through their effects on the propagation of electromagnetic radiation. When the polarization of such materials is linearly dependent (or only very weakly non-linearly dependent) on the electric field strength of an electromagnetic wave propagating through the material, the effect of the linear polarization is to produce a constant refractive index, which is responsible for modifying the speed of the wave through the material. In such a linear case, an incident oscillating electromagnetic field at frequency $\omega$ produces an oscillation of the polarization at the same frequency $\omega$ which, in turn, produces a re-radiated electromagnetic field also of the same frequency but out of phase with the incident wave.

The original incident wave, combined with phase-varying re-radiated waves along the forward propagation direction of the incident wave, creates a net transmitted wave that moves through the material at an apparently slower speed but same frequency. The speed, $v(\omega)$, of the transmitted wave in the crystal, is defined as $c/n(\omega)$, where c is the speed of the wave in vacuum (ie., the speed of light) and $n(\omega)$ is the index of refraction of the medium which, as indicated, depends on the frequency $\omega$ of the wave (ie., the medium is generally dispersive). Another important parameter of the medium is $k(\omega)$, the propagation constant of the radiation, which is defined as: $k(\omega)=2\pi n(\omega)/\lambda$, where $\lambda$ is the wavelength of the wave in vacuum.

If the polarization at a position x within the crystal is a non-linear function of the field at that position, the propagation of an electromagnetic wave can be affected in additional ways. For example, the propagation of a wave with frequency $\omega_1$ will lead to the propagation of a secondary wave with frequency $2\omega_1$, which is the second harmonic of the wave. If two waves, of different frequencies $\omega_1$ and $\omega_2$ simultaneously propagate through the non-linear crystal, there will be generated additional waves of frequencies $\omega_1+\omega_2$, $\omega_1-\omega_2$, $2\omega_1$ and $2\omega_2$. Each wave periodically modulates the polarization which the other wave sees and which it sees itself and, as a result, new waves are generated.

When waves at two different frequencies $\omega_1$ and $\omega_2$ and two different propagation constants $k_1$ and $k_2$ propagate a distance L through a non-linear crystal, one wave ($k_1$) can transfer power to the other wave ($k_2$) through the non-linearity of the polarization. The amount of power transferred after the wave has traveled a distance L in the crystal can be shown to be proportional to: $L^2(\sin x/x)^2$, where $x=(k_3-k_1-k_2)L/2=L\Delta k/2$ and $k_3$ is the propagation constant of the polarization wave. If $\Delta k$ is not zero, the transfer of power reaches a maximum value when the wave has propagated a distance called the coherence length, $L_c$, where $L_c\Delta k/2=\pi/2$, ( ie. $L_c=\pi/\Delta k$). If $\Delta k=0$, the incident waves and the polarization wave are said to be phase locked and the power transfer increases along the entire length of the crystal and is proportional to $L^2$, where L is the length of the entire crystal. If $\Delta k$ is not zero, the maximum power transfer occurs within the coherence length, then goes to zero, then rises again in the next coherence length. In general, the power transfer within the coherence length is the maximum transfer possible, no matter through how many coherence lengths the waves propagate. Since obtaining a phase locked condition is very difficult in practice (it has been obtained using birefringent crystals) and will only occur at particular k values, an alternative approach to maximizing power transfer is through "quasi-phase matching" or QPM. QPM is obtained by changing the phase between the propagating wave and the polarization wave by $\pi/2$ every time the propagating wave moves through an additional coherence length. This can be accomplished by rotating the polarization direction within the crystal by 180° in successive coherence lengths. Unlike true phase matching, QPM can be obtained for a wave of arbitrary k value, providing the polarizations in the crystal can be rendered appropriately periodic in successive coherence lengths. Thus, by satisfying the QPM condition, the maximum power transfer is incremented in each successive passage of the wave through a coherence length, rather than falling to zero. Such a periodic rotation of polarization domains (domain reversals) of width $L_c$ is usually accomplished by applying a high voltage to reverse the direction of the domain directly (of which more will be said in the following). Although quasi-phase matching does not produce the amount of power transfer produced by genuine phase matching (because the factor $(\sin x/x)^2$ is 1 for $\Delta k=0$, but is $4/\pi^2$ for $L_c\Delta k=\pi/2$), it is much better than the non-QPM case. Much inventive effort has been expended in finding ways of rotating crystal polarizations in a periodic manner with the coherence length being the period.

A case of particular interest in modern technology occurs when $\omega_2=2\omega_1$, which is called frequency doubling or second harmonic generation (SHG). Obtaining a meaningful power transfer between an incident wave and its frequency doubled second harmonic allows the production, for example, of coherent green or blue light by the passage of near infra-red radiation from a solid state laser through a non-linear ferroelectric crystal. Since coherent infra-red radiation is easier to produce by laser action than coherent blue or green radiation, being able to obtain the green or blue by SHG is quite important. Such green or blue light is important for reading and writing optical storage disks. The coherence length needed to obtain efficient frequency doubling is given by: $L_c=\pi/(2k_1-k_2)$. Note that $2k_1-k_2$ is not zero because of the dispersion of the material, so true phase locking is generally not possible. As noted above, use of QPL by poling non-linear ferroelectric crystals such as congruent lithium niobate (congruent $LiNbO_3$, or CLN) or stoichiometric lithium tantalate (stoichiometric $LiTaO_3$ or SLT) allows frequency doubling of radiation within the entire range of frequencies for which these crystals are transparent: (0.32 microns–5.5 microns) for CLN and (0.27 microns–5.5 microns) for SLT.

Various approaches to form waveguides within non-linear optical materials to improve their conversion efficiency have been tried, including the diffusion of Ti, Zn and $H^+$ ions. The key factors for high conversion efficiency are high non-linear response of the material, high optical power density for the interacting waves within the material, long interaction length for the waves and the maintenance of a good phasematching condition between the waves within the region of their interaction. As will be briefly discussed below, quasi-phasematching techniques have been developed to provide a good phasematching condition in certain nonlinear materials such as lithium niobate, lithium tantalate, potassium titanyl phosphate and strontium barium niobate, by the creation of a spatially periodic distribution of reversed ferroelectric domains of coherence length in which the orientation of the spontaneous polarization directions is reversed in adjacent domains. Although QPM improves the conversion efficiency of the crystal material, there is still a significant problem associated with the necessity of having the incident (pumping) radiation propagate in a tightly focused beam to provide adequate power density within the region of wave overlap. In bulk material, the pumping beam cannot be tightly focused since the propagation wave will diffract, therefore it is usually weakly focused, resulting in low conversion efficiency. A solution to this problem is to fabricate a waveguide configuration within the crystal, thereby maintaining a tightly confined beam over a long interaction length.

To achieve high conversion efficiency within a waveguide configuration it is necessary not only to tightly focus the beam to increase the optical power density, but also to increase the mode overlapping between the interaction waves (pumping wave and conversion wave) and the material nonlinearity (the polarization waves induced within the material). To accomplish this, the waveguide region of the material requires an optimized index of refraction profile which generally means both a high index and a symmetric profile. FIG. 1a is a schematic illustration of bad mode overlapping within a waveguide region having a poor index profile, whereas FIG. 1b is a schematic illustration of good mode overlapping within a waveguide configuration having an optimal index profile.

Several methods have been used in the prior art to fabricate waveguides on or within ferroelectric crystals. For example, a method to fabricate an annealed (heat treated) proton-exchanged waveguide has been tried, using pure benzoic acid to produce the exchange and a high temperature post heat treatment. Such methods lead to questionable results, particularly when doped ferroelectric materials are used. For example, Yamamoto et al. (U.S. Pat. No. 5,205,904) teach a method of forming an optical waveguide over a ferroelectric crystal which has been treated by proton exchange to form periodic domain inverted regions. The method comprises an initial formation of a titanium mask to protect the surface of the crystal during a heat treatment process applied after the proton exchange is carried out. The subsequent heat treatment allows the formation of deeper and more well-defined regions of domain inversion because the initial proton exchange is carried out below the Curie temperature of the crystal.

Also in this regard, Minakata et al. (U.S. Pat. No. 6,363,189 B1) teaches the formation of a directional coupler using at least two optical waveguides disposed within a ferroelectric crystal. The waveguides are formed by immersing a crystal that has been photolithographically patterned on its surface into benzoic acid at 200° C. for 30 minutes to form proton exchanged regions, then annealing the crystal at 300° C. for 4 hours to form the waveguide regions. This produces a difference of $4\times10^{-3}$ between the indices of refraction of the crystal and the proton exchanged regions.

Mizuuchi et al. (U.S. Pat. No. 6,519,077 B1) adopts a two-step ion-exchange method to fabricate a waveguide with a high index cladding layer. The second ion-exchange is applied close to a surface region to which a first annealed ion-exchange has already been applied to form the cladding layer. The resulting two-step process produces a smooth but asymmetric index profile which does not allow optimal mode overlap as previously discussed.

Mizuuchi et al. (U.S. Pat. No. 5,872,884) also teaches a ridge type waveguide, which is a strip of high index of refraction material formed on the surface of a non-linear ferroelectric crystal together with a cladding layer that is formed over the strip. The indices of refraction are chosen so that the waveguide strip guides two wavelengths of light, $\lambda_1$ and $\lambda_2$, where $\lambda_1>\lambda_2$, while the cladding layer guides only $\lambda_2$ and cuts off for $\lambda_1$.

In an earlier patent, Yamamoto et al. (U.S. Pat. No. 4,946,240) also teach a ridge type waveguide disposed on the surface of a $LiNb_xTa_{1-x}O_3$ substrate. The ridge, which is not cladded, propagates a single mode between an input part and an output part. Ridge type waveguides do offer improved lateral confinement of the interacting waves, but there remains an asymmetry in the vertical direction which limits the efficiency of the conversion process.

Harada et al. (U.S. Pat. No. 4,952,013) teach the formation of an optical wavelength conversion device of an optical fiber configuration, wherein the fiber has a core of nonlinear material and a cladding of amorphous material with a lower index of refraction than the core. The conversion is carried out by a method of Cherenkov radiation (see Umegaki, cited above) in which phase matching is carried out between the fundamental mode propagating in the core and a second harmonic mode propagating within the cladding.

Using the currently more conventional QPM phasematching in domain reversed crystalline material, Matsuda et al. (U.S. Pat. No. 5,313,543) provide a second harmonic generation device in which a waveguide layer passes through a region of domain reversals in a ferroelectric crystal. Within the objects of the method there is a primary object of reducing the noise inherent in the fundamental wave resulting from reflections of the fundamental wave from an inlet of the waveguide.

Okazaki et al. (U.S. Pat. No. 5,436,757) provide an optical wavelength converting apparatus wherein two laser inputs can provide fundamental waves of different wavelengths and a nonlinear ferroelectric conversion device can combine the input waves in various sum and difference combinations.

Hatori (U.S. Pat. No. 6,195,198 B1) provides an optical frequency doubling ferroelectric device which includes a waveguide formed therein and a laser input source incorporating a beam-splitter/mirror to reflect a portion of the input wave back to the laser. The reflected portion passes through a narrow band-pass filter and is used to lock the oscillation frequency of the laser.

Yamamoto et al. (U.S. Pat. No. 5,515,471) teach the formation of a frequency doubler comprising a ferroelectric crystal within which periodic inverted domain regions have been formed by proton exchange followed by a heat treatment. A waveguide region is also formed within the crystal, passing through the regions of domain inversion.

Within the method, a nonlinear degradation layer is formed on the surface of the waveguide, wherein the $TM_{00}$ mode within the waveguide is converted to a $TM_{10}$ mode which is then frequency doubled by passage through the crystal.

As was noted above, a major factor in producing wave confinement within a waveguide region is the symmetry of the index of refraction within the region, particularly with respect to the vertical direction from the surface of the crystal to the interior of the crystal. In most of the prior art, the waveguide region is formed within the crystal by subjecting a region below the crystal surface to proton exchange in order to change the index of refraction of that region. This process generally involves the diffusion of a proton exchange medium (eg. benzoic acid) through patterned openings in the crystal surface and thereafter into the crystal interior. The diffusion process is typically enhanced by a subsequent heat treatment of the crystal that produces an equilibrium between diffusion caused by gradients in chemical concentration and diffusion caused by temperature gradients. As has been discussed above, these processes take a long time and can cause significant damage to the crystal, particularly to its surface. In addition, the symmetry that is obtained for the index of refraction within the waveguide region, particularly that portion of the waveguide region adjacent to the crystal surface, is often less than adequate for the efficient conversion process. The purpose of the present invention, therefore, is to provide a method of producing a waveguide region buried within a ferroelectric crystal that is characterized by a symmetric index of refraction and yet has a processing time of reasonable length and does not damage the crystal surface.

SUMMARY OF THE INVENTION

A first object of this invention is to provide a method for forming a buried optical waveguide region beneath the surface of a crystal, such as a ferroelectric crystal, wherein such waveguide region is characterized by a symmetric index of refraction about an axis parallel to the desired propagation direction of optical radiation through the crystal.

A second object of the present invention is to form such a waveguide region within a nonlinear ferroelectric crystal that has its electrical polarization formed as a plurality of periodically reversed domain regions whose widths are coherence lengths appropriate to the wavelengths to be processed so that a quasi-phasematched (QPM) condition between an incident fundamental mode and other interacting modes can be efficiently obtained.

A third object of this invention is to provide such a method that utilizes a dilute and high-temperature proton exchange technique, creating thereby an equilibrium condition in the diffusion activities of $H^+$ and $Li^+$ ions between chemical concentration and temperature gradients, causing, thereby, a refractive index profile with a smooth gradient.

A fourth object of the present invention is to produce such a waveguide region while preventing surface damage to the ferroelectric crystal due to the high concentration of proton exchange solution used in the conventional proton exchange process.

A fifth object of the present invention is to provide such a method that will produce an optical conversion system (a waveguide within a quasi-phasematched crystal) with higher conversion efficiency and lower propagation losses.

A sixth object of the present invention is to provide such an optical conversion system that converts an incident signal of a given frequency into an outgoing signal having a sum frequency, difference frequency or doubled frequency based on the properties of the nonlinear crystal with the adequate periodic reversed domain structure.

A seventh object of the present invention is to provide a converted signal having a symmetric output beam profile as a result of the symmetric refractive index profile and symmetric geometry of the waveguide.

The objects of the present invention are achieved by use of a novel and effective technique that combines dilute and high temperature proton exchange with reversed proton exchange to fabricate a high-efficiency optical wavelength converter having a symmetric refractive index profile within its waveguide portion. The present technique can be broadly applied to optical waveguide fabrications within a wide variety of optically transparent media, to produce a wide variety of optical devices and for use in a wide variety of applications.

The optical waveguide of the preferred embodiments of the present invention is fabricated within a periodically domain reversed nonlinear ferroelectric crystal. First, a single domain nonlinear ferroelectric crystal substrate is provided. The single domain crystal is fabricated to a periodically domain reversed configuration by applying a high voltage to the crystal through a photolithographically patterned metal electrode with proper width and periodicity, where a $SiO_2$ layer (or other dielectric layer) has been deposited onto the substrate in advance. The crystal is now in a quasi-phasematched (QPM) configuration that allows its nonlinear properties to provide optical conversion of an incident wave. Following the domain reversal formation, the crystal is prepared for the formation of the internal waveguide configuration that is a novel part of the present invention. In an initial process step, a plurality of channels are patterned in a layer of several hundred angstroms thick $SiO_2$ formed on the crystal surface, the channels being along the periodicity direction (longitudinal) of the domain reversed regions. The channels will allow the application of various high temperature proton exchange producing solutions (solutions which replace the $Li^+$ ions in the crystal with $H^+$ ions) to exposed portions of the crystal surface and for $H^+$ ions to enter the crystal, forming regions of controlled refractive index profiles (since the presence of $H^+$ ions produces a higher refractive index) beneath the surface of the crystals. These regions, when formed with the properly symmetric index profiles (resulting from the proper optimized combination of concentration-gradient diffusion and temperature-gradient diffusion, which is a part of the present invention), will become efficient waveguides for incident and transmitted radiation. Experimental evidence and theoretical considerations indicate that the $H^+$ concentration within the substrate is determined by the concentration of the proton exchange solution, the temperature at which the exchange process is carried out and the time in which the exchange process is carried out. During the exchange process, the inventors determined that there exists an equilibrium condition between $H^+$ concentration and processing temperature. Both low $H^+$ concentration and high temperature lead to low proton concentrations in the substrate. On the other hand, high $H^+$ concentrations and low temperature lead to high proton concentrations and correspondingly high refractive index. To produce the desired smooth refractive index profile, the competition between these factors must be modified.

In a preferred embodiment of the invention, there is formed a single crystal-phase gradient index device, without surface damage to the crystal, using a dilute and high temperature proton exchange method in the crystal substrate which does not alter the crystal phase of the substrate. The dilute proton exchange method requires the dilution of the concentration of the conventional proton exchange medium, benzoic acid, by the addition of lithium benzoate. The diluted solution is applied at high temperature (approximately 300–380° C., for several tens of hours), yet it does not damage the crystal surface, it leaves the crystal in a single phase and it produces a smooth refractive index profile without the need for subsequent thermal processing of the crystal at a high temperature. A high temperature anneal of the crystal after the proton substitution has occurred could damage the crystal, so it is highly advantageous that this method eliminates the need for such post exchange heat treatment. It is known in the art that low power loss of the propagating radiation and high susceptibility of the crystal are both obtained when the crystal is in a single crystalline phase and the normalized proton concentration is below 0.3. Thus, by producing these conditions, the stated objects of the invention are obtained.

Within the preferred embodiment of the invention, subsequent to the dilute and high-temperature proton exchange, the refractive index of the optical waveguide region is further shaped and rendered symmetric using a reversed proton exchange (RPE) method.

This method, which can be found discussed in "Reverse Exchange Method For Burying Proton Exchanged Waveguides," J. L. Jackel and J. J. Johnson, Electronics Letters, 18th Jul. 1991, Vo. 27, No. 15, produces a more symmetric waveguide refractive index profile than is provided by prior art methods and the increased symmetry increases the overlap between the fundamental mode of the incident radiation and the second harmonic produced by the non-linearity of the QPM crystal for radiation substantially confined within the waveguide. Accordingly, the conversion efficiency of the device is improved and the beam profile of the emergent beam is rendered more symmetric. The symmetry of the waveguide formation is produced by the restoration of the initial $H^+$ concentration and index of refraction of the crystal near the crystal surface by the RPE process, which adds $Li^+$ near the surface by means of the addition of the RPE solution (possible constituents of such a solution being lithium nitrate, sodium nitrate and potassium nitrate) at the crystal surface. The $Li^+$ substitutes for the $H^+$ ions near the surface and lowers the index of refraction appropriately and in a short time.

Within the preferred embodiment, it was found that immersing the substrate in a lithium-rich melt of $LiNO_3$: $KNO_3$:$NaNO_3$ with a molar ratio of approximately 37.5: 44.5:18.0, and having a melting point of approximately 130° C., at a processing temperature of between approximately 300–380° C. for several hours, produced the desired surface effect of restoring the original refractive index of the substrate to its pre-exchange condition and, thereby, produced the desired symmetric profile. It was noted that the short-time high temperature process step just discussed, did not adversely affect the crystal properties because the proton concentration within the waveguide region was already relatively low.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIGS. 1a and 1b schematically illustrate good and bad mode overlapping as it relates to a refractive index profile.

FIG. 2 schematically illustrates a prior art two step proton exchange process and the waveguide refractive index profile it provides.

DESCRIPTION OF THE PREFERRED EMBODIMENTS

Figure 3A:
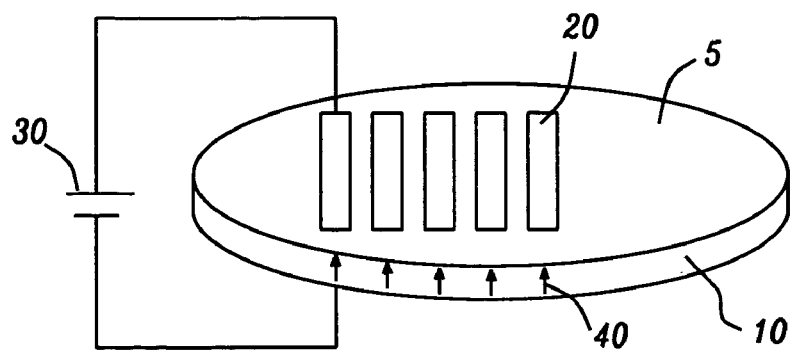
FIGS. 3a and 3b schematically illustrate the formation of a periodically domain-reversed crystal such as would incorporate the waveguide of the present invention.

The preferred embodiments of the present invention teach a method of forming a buried waveguide having a symmetric refractive index profile within a periodically domain reversed nonlinear ferroelectric crystal without damaging the optical properties of the crystal. The symmetric form of the waveguide index profile allows the input and polarization waves to overlap for an efficient energy transfer and promotes an optimal cross-section of the output wave. The resulting device can be advantageously used for a wide range of optical wavelength processing, including optical frequency conversion.

Referring first to FIG. 1a, there is shown an example of poor overlap between two modes within a waveguide region, a fundamental input radiation mode (1) and a resulting mode produced by the nonlinear response of the crystal (2). The poor overlap is a result of the non-symmetric refractive index profile (3) of the waveguide region, which is highest at the crystal surface (4) and lowest within the interior (5).

Referring to FIG. 1b, there is shown an analogous diagram for a waveguide region having a symmetric index profile (3), wherein the index peaks at an intermediate region (6) within the crystal interior and is lowest at both the surface (4) and deeper interior regions (5).

Figure 3B:
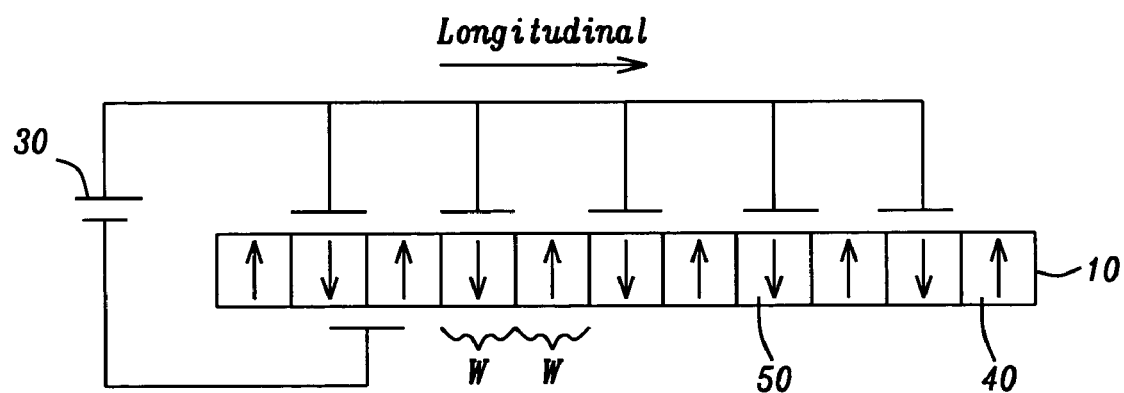

Referring next to FIG. 2, there is shown a schematic illustration of a refractive index profile (analogous to (3) in FIG. 1a) that is similar to that produced by a two-step proton exchange process taught in the prior art (see FIGS. 3A and 3B of U.S. Pat. No. 6,519,077 B1, also cited above). The profile is drawn alongside a schematic sketch of a crystal substrate, showing two regions of proton exchange, an upper region (6), which is a cladding region of high index and a lower region (5), which confines a substantial portion of the propagating waves. The index of refraction profile drawn alongside shows the corresponding regions.

Referring next to FIG. 3a, there is shown, schematically in perspective, the formation of a domain reversed crystal substrate within which the waveguide of the present invention will be formed and which, in conjunction with the use of said waveguide, will form an optical conversion device. Although the method for producing the waveguide of the present invention will be applicable to a wide range of crystal substrates, the substrate (10), of the preferred embodiment is a nonlinear ferroelectric crystal which is provided in a single domain state nominally indicated as in the upward vertical direction (see arrows (40)). The substrate preferably has at least one substantially planar surface. A series of electrodes are formed by creating openings (20) in a surface dielectric layer (15) through which electrical contact can be made to the substrate surface so that a periodic electric field can be established in the crystal (as indicated by a battery (30) drawn schematically). It is noted that this is one method of forming electrodes on the substrate surface and other methods are known in the art for accomplishing the same end.

Referring to FIG. 3b, there is shown a cross-sectional view of the crystal in FIG. 3a, wherein periodic domain reversals have been created. The domains alternate with upwardly directed polarizations (40) and downwardly directed polarizations (50), the downwardly directed polarizations being the reversed polarizations produced by the electric field. The width, W, of each domain (also the period of the domain reversals) is measured along the longitudinal direction (arrow) and is equal to a coherence length for the production of the quasi-phase matching (QPM) between a plurality of electromagnetic waves required for the desired frequency conversion of the device being constructed. The production of such a periodically domain reversed crystal is known in the prior art and there are a variety of methods suitable for its formation. In a preferred embodiment of the present invention a periodically domain reversed MgO doped lithium niobate substrate was formed having periodically reversed domains of widths between approximately 15 to 18 microns. Such a crystal and domain structure is a particularly efficient converter for an incident 1550 nanometer wavelength.

Figure 4A:
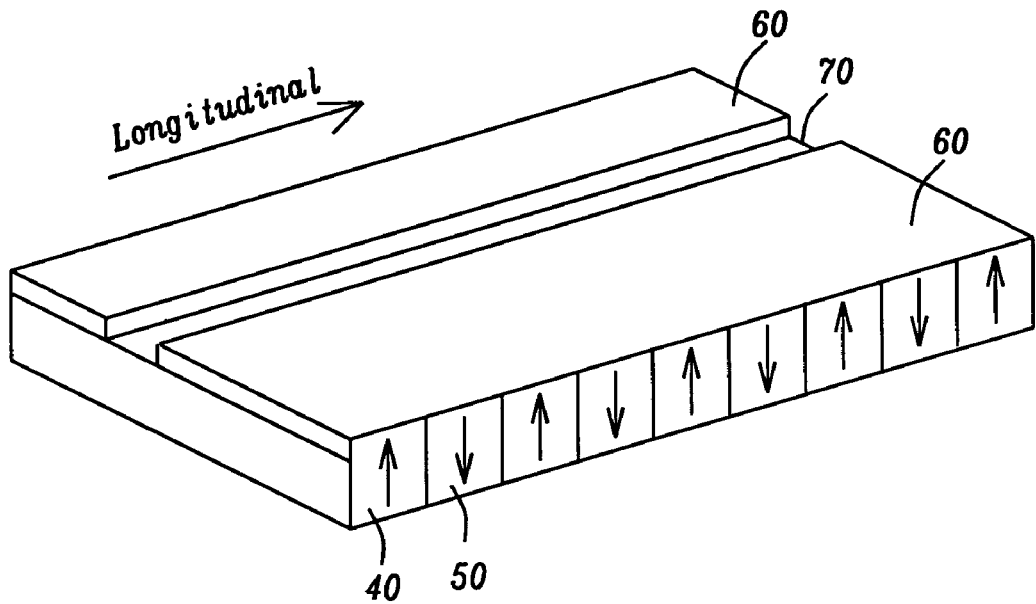
FIGS. 4a and 4b schematically show the initial steps in forming channels on the crystal of FIG. 2 through which waveguide regions would be formed by dilute and high temperature proton exchange processes followed by reverse proton exchange.

Referring next to FIG. 4a, there is shown the crystal substrate of FIG. 3a, whereon a layer of $SiO_2$ (60) or other dielectric material has been formed to a thickness of approximately several hundred angstroms. A plurality of parallel, strip-shaped channels have been etched through the layer to expose the crystal substrate surface using, for example, buffer oxide etchant (BOE), with one such etched channel being schematically shown (70). The width of the channel (in the direction transverse to the longitudinal direction) is between approximately 5 and 10 microns. There is also seen the periodically reversed domain regions, with the arrows indicating the direction of polarization within the domains. The direction of the channels is the longitudinal direction (arrow), along which the widths of the domains are also measured.

Figure 4B:
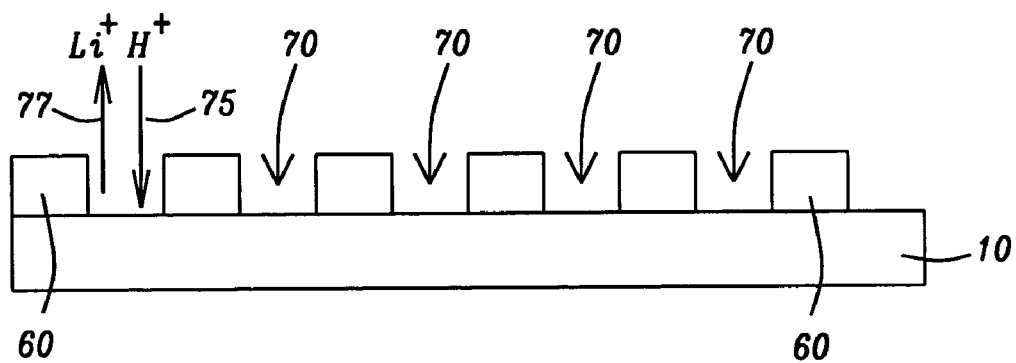

Referring next to FIG. 4b, there is shown a cross-sectional view of the fabrication of FIG. 4a, wherein a plurality of channels are indicated (70). By immersing the fabrication in a dilute and high temperature proton exchange medium, $H^+$ ions (arrow(75)) are caused to enter the crystal through the channel openings and $Li^+$ ions (arrow (77)) are removed from the crystal. The dilute proton exchange method requires the dilution of the concentration of the conventional proton exchange medium, benzoic acid, by the addition of lithium benzoate. The diluted solution is applied at high temperature (approximately 300–380° C., for several tens of hours), yet it does not damage the crystal surface, it leaves the crystal in a single phase and it produces a smooth refractive index profile without the need for subsequent thermal processing of the crystal at a high temperature. A high temperature anneal of the crystal after the proton substitution has occurred could damage the crystal, so it is highly advantageous that this method eliminates the need for such post exchange heat treatment. It is known in the art that low power loss of the propagating radiation and high susceptibility of the crystal are both obtained when the crystal is in a single crystalline phase and the normalized proton concentration is below 0.3. Thus, by producing these conditions, the stated objects of the invention are obtained. In forming the 1550 nanometer converter of the preferred embodiment referred to above, a benzoic acid solution diluted with between approximately 0.5% to 5% lithium benzoate was applied at a temperature of between approximately 300° to 380° C. for between approximately 24 and 48 hours. It is to be noted that the time duration of the dilute exchange process is dependent on the particular waveguide structure required and the particular device in which it is to be formed.

Figure 5A:
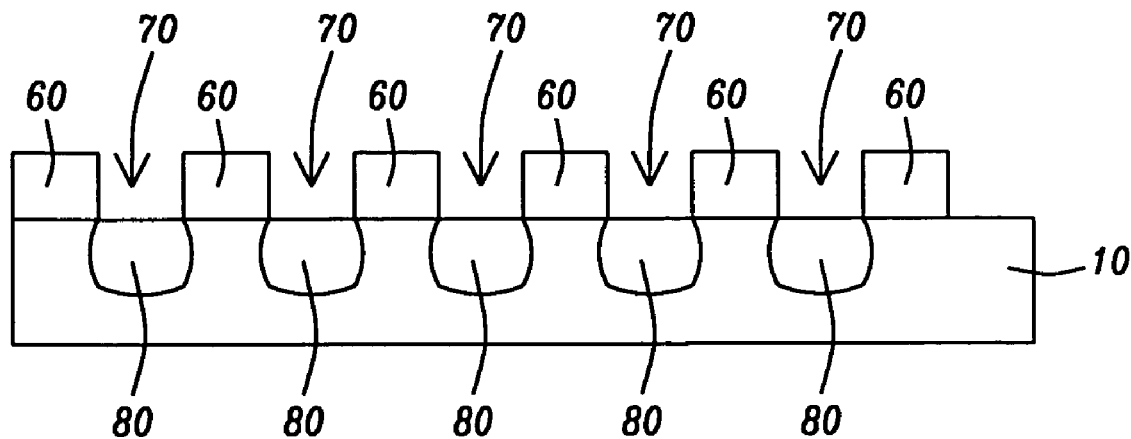
FIGS. 5a and 5b schematically illustrate the subsequent application of the reverse proton exchange solution to the surface region of the crystal in order to restore the high index profile to the surface region.

Referring next to FIG. 5a, there is shown in schematic cross-section the fabrication of FIG. 4b wherein a region of high index of refraction (80) has been formed beneath each channel (70) as a result of the proton exchange illustrated in FIG. 4b. FIG. 5a shows the plurality of channels in a cross-sectional view, clearly indicating the formation of high refractive index regions (80) beneath each channel.

Figure 5B:
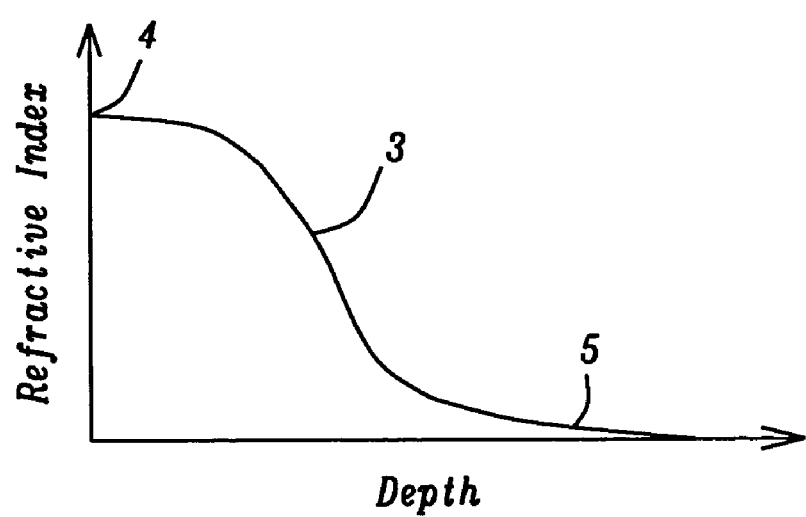

Referring to FIG. 5b, there is shown the refractive index profile within the regions (80) of the crystal, which is illustrated by a graph (3) of refractive index (ordinate) vs. depth measured from the crystal surface (abscissa). The diffusion of the $H^+$ ions into the crystal produces the highest index of refraction at the surface (4) where the concentration of $H^+$ ions is highest and the lowest index in the interior (5), where the $H^+$ ion concentration is lowest.

Figure 6A:
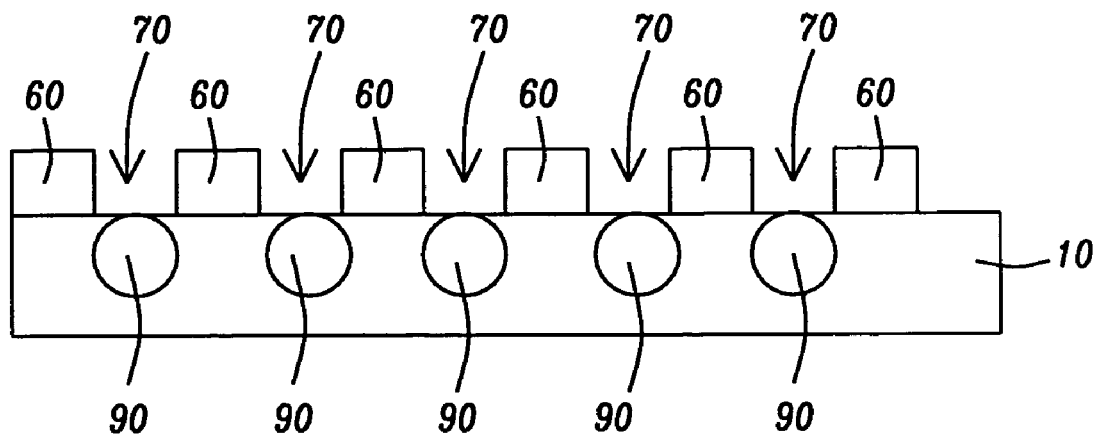
FIGS. 6a and 6b schematically show the symmetric refractive index cross-sectional profile of the waveguide region subsequent to the steps of FIGS. 3 and 4.
Figure 6B:
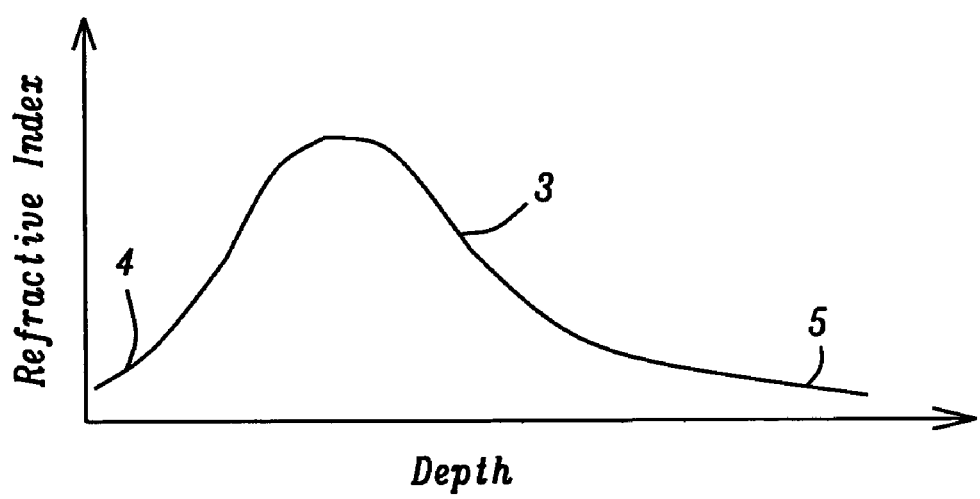

Referring next to FIG. 6a, there is shown a schematic cross-sectional view of the plurality of channels of the fabrication in FIG. 5a, wherein a reverse proton exchange process has now been applied through the crystal surface through the channel. The reverse proton exchange process restores the original index of refraction to the region of the crystal immediately below its surface, thereby rendering the refractive index profile vertically symmetric, as shown in FIG. 6b. The channels are now indicated schematically as ellipses (90) in FIG. 6a, to represent the symmetric refractive index profile. It is noted that the horizontal diffusion of $H^+$ ions produced during the dilute proton exchange process is also substantially symmetric, so the waveguide region is substantially symmetric both vertically and horizontally, leading to a significant improvement in wave confinement, energy transfer between waves and a symmetric wave cross-section. FIG. 6b schematically shows the refractive index profile (3), indicating the restoration of the original low index just beneath the surface (4) and the equally low index within the interior (5), beyond the diffusion depth of the $H^+$ ions. In the case of the preferred embodiment of the 1550 nanometer converter discussed above, the reversed proton exchange is produced by immersing the crystal, having already been treated with a dilute high temperature proton exchange, into a lithium rich melt of $LiNO_3:KNO_3:NaNO_3$ with a molar ratio of approximately 37.5:44.5:18.0, and having a eutectic point of approximately 130° C., at a processing temperature of between approximately 300–380° C. for between approximately 2 and 5 hours, to produce the desired surface effect of restoring the original refractive index of the substrate to its pre-exchange condition and, thereby, produce a desired symmetric profile, which is symmetric vertically (perpendicularly beneath the surface plane) and horizontally about the axis of the waveguide region. It was noted that the short-time high temperature process step just discussed, did not adversely affect the crystal properties because the proton concentration within the waveguide region was already relatively low. It is also noted that the processing time for the reversed proton exchange, like the processing time of the dilute high temperature exchange, is dependent on the nature of the waveguide required and the device in which it is to be used. Several embodiments of the waveguide formation process within wavelength conversion devices that act on different initial wavelengths will be presented herein, each of which require different processing times. For example:

(1) For the preferred embodiment discussed above, which is second harmonic generation (SHG) from 1550 nm incident pumping light to produce a 750 nm outgoing radiated wave, the RPE (reverse proton exchange) time is between approximately 2 and 5 hours.

(2) For a second preferred embodiment of difference frequency generation (DFG) from 1064 nm and 1550 nm incident pumping light to produce a 3393.5 nm outgoing radiated wave, the RPE time is between 4 and 8 hours.

(3) For a third preferred embodiment of second harmonic generation (SHG) from 980 nm incident pumping light to produce a 490 nm outgoing radiated wave, the RPE time is about between 0.5 and 2 hours.

In the second preferred embodiment (example (2) above), a mid-range IR wavelength converter was fabricated by producing domain reversals of width between approximately 25–30 microns in a MgO doped lithium niobate crystal and then subjecting the crystal to a dilute and high temperature proton exchange process as disclosed above, followed by a reversed proton exchange process as disclosed above, for a shortened time of between approximately 4 and 8 hours.

In yet a third preferred embodiment (example (3) above) to fabricate a highly efficient blue light converter, a similar MgO doped lithium niobate crystal was periodically domain reversed with a domain reversal width of between approximately 4 and 6 microns. The sample was immersed in benzoic acid diluted with lithium benzoate as disclosed above for between approximately 5 and 12 hours, then processed to form a reversed proton exchange region as disclosed above, but with a shortened time of between 0.5 and 2 hours.

As is understood by a person skilled in the art, the preferred embodiments of the present invention are illustrative of the present invention rather than limiting of the present invention. Revisions and modifications may be made to process parameters, materials, structures and dimensions provided in forming highly efficient optical waveguides by a combined process of dilute and high temperature proton exchange and reversed proton exchange, while still forming highly efficient optical waveguides by a combined process of dilute and high temperature proton exchange and reversed proton exchange in accord with the spirit and scope of the present invention as defined by the appended claims.

What is claimed is:

1. A method for forming an optical waveguide having a symmetric refractive index profile within a ferroelectric crystal comprising:
    providing a ferroelectric crystal substrate having at least one substantially planar surface;
    forming on said surface a dielectric layer having at least one strip-shaped channel formed therein, said channel having substantially parallel sides and said channel exposing a corresponding strip-shaped portion of said substrate surface;
    forming within said crystal and beneath said channel a waveguide region by a method further comprising:
        treating said substrate surface with a dilute proton exchange solution at a first temperature for a first time duration, producing, thereby, a waveguide region having a smoothly decreasing refractive index profile characterized by a highest $H^+$ ion concentration and highest index of refraction immediately beneath said substrate surface and a $H^+$ concentration and index of refraction diminishing smoothly therebelow; then
        treating said substrate with a reverse proton exchange solution at a second temperature for a second time duration, restoring, thereby, the original index of refraction of the crystal within a region immediately below said surface while leaving said substrate surface undamaged and leaving said waveguide region beneath said substrate surface with an unaltered crystalline phase and a normalized $H^+$ concentration below approximately 0.3.

2. The method of claim 1 wherein the ferroelectric crystal is a crystal of lithium tantalate, lithium niobate, MgO doped lithium tantalate, MgO doped lithium niobate, ZnO doped lithium niobate or ZnO doped lithium tantalate.

3. The method of claim 1 wherein the dielectric layer is a layer of $SiO_2$, formed to a thickness of between approximately 500 and 1000 angstroms.

4. The method of claim 1 wherein the width of the channel is between approximately 5 and 10 microns.

5. The method of claim 1 wherein the dilute proton exchange solution is a solution of benzoic acid in which has been dissolved lithium benzoate with a weight percentage of between approximately 0.5 and 5.0%.

6. The method of claim 1 wherein the first temperature and the second temperature are between approximately 300° C. and 380° C.

7. The method of claim 1 wherein the reverse proton exchange solution is a solution formed as a mixture of $LiNO_3:KNO_3:NaNO_3$ with a molar ratio of approximately 37.5:44.5:18.0.

8. A method for forming a highly efficient optical wavelength converter including an optical waveguide having a symmetric refractive index profile formed within a ferroelectric crystal having periodically reversed polarization domains of a width to provide a quasi-phasematching condition between a plurality of optical radiation wavelengths within said crystal, comprising:
    providing a ferroelectric crystal substrate having a unidirectional polarization direction and at least one substantially planar surface that is perpendicular to said polarization direction;
    forming a periodically reversed domain structure within said crystal substrate;
    forming on the planar surface of said periodically domain reversed substrate surface a dielectric layer having at least one strip-shaped channel formed therein, said channel having substantially parallel sides, the direction of said channel being in a longitudinal direction, which is also the direction of the width of said domains, and said channel exposing a corresponding strip-shaped portion of said substrate surface;

forming within said crystal and beneath said channel a waveguide region having a symmetric refractive index profile by a method further comprising:

treating said substrate surface with a dilute proton exchange solution at a first temperature for a first time duration, producing, thereby, a waveguide region having a smoothly decreasing refractive index profile characterized by a highest $H^+$ ion concentration and highest index of refraction immediately beneath said substrate surface and a $H^+$ concentration and index of refraction diminishing smoothly therebelow; then treating said substrate with a reverse proton exchange solution at a second temperature for a second time period, restoring, thereby, the original index of refraction of the crystal within a region immediately below said surface while leaving said substrate surface undamaged and said waveguide region beneath said substrate surface with an unaltered crystalline phase and a normalized $H^+$ concentration below approximately 0.3.

9. The method of claim 8 wherein the ferroelectric crystal is a crystal of lithium tantalate, lithium niobate, MgO doped lithium tantalate, MgO doped lithium niobate, ZnO doped lithium niobate or ZnO doped lithium tantalate.

10. The method of claim 8 wherein the dielectric layer is a layer of $SiO_2$, formed to a thickness of between approximately 500 and 1000 angstroms.

11. The method of claim 8 wherein the width of the channel is between approximately 5 and 10 microns.

12. The method of claim 8 wherein the dilute proton exchange solution is a solution of benzoic acid in which has been dissolved lithium benzoate with a weight percentage of between approximately 0.5 and 5.0%.

13. The method of claim 8 wherein the first temperature and the second temperature are between approximately 300° C. and 380° C.

14. The method of claim 8 wherein the reverse proton exchange solution is a solution formed as a mixture of $LiNO_3$:$KNO_3$:$NaNO_3$ with a molar ratio of approximately 37.5:44.5:18.0.

15. The method of claim 8 wherein the substrate is MgO doped lithium niobate, the width of each domain reversed region is a coherence length of between approximately 15 and 18 microns, the first time duration is between approximately 24 and 48 hours and the second time duration is between approximately 2 and 5 hours and the converter thereby formed efficiently converts incident radiation of approximately 1550 nanometers to radiation of approximately 775 nanometers.

16. The method of claim 8 wherein the substrate is MgO doped lithium niobate, a width of each domain reversed region is a coherence length of between approximately 25 and 30 microns, the first time duration is between approximately 24 and 48 hours and the second time duration is between approximately 4 and 8 hours and the converter thereby formed converts incident radiation approximately 1064 nanometers and 1550 nanometers in DFG function to radiate an output signal with wavelength approximately 3393.4 nanometers.

17. The method of claim 8 wherein the substrate is MgO doped lithium niobate, a width of each domain reversed region is a coherence length of between approximately 4 and 6 microns, the first time duration is between approximately 5 and 12 hours and the second time duration is between approximately 0.5 and 2 hours and the converter thereby formed converts incident radiation of approximately 980 nanometers to radiation of approximately 490 nanometers.

18. A highly efficient optical wavelength converter including an optical waveguide having a symmetric refractive index profile formed within a ferroelectric crystal of unaltered crystalline phase and undamaged surface, having periodically reversed polarization domains of a width to provide a quasi-phasematching condition between a plurality of optical radiation wavelengths within said crystal and wherein said optical waveguide provides highly efficient energy transfer between said optical radiation and produces an outgoing wave of symmetric cross-section, comprising:

a ferroelectric crystal substrate having a domain structure which is periodically reversed in a longitudinal direction;

a waveguide region formed within said substrate, said waveguide region being in said longitudinal direction and said waveguide region having a refractive index profile which is substantially symmetric about a central axis in said longitudinal direction and wherein said waveguide region within the crystal substrate retains a single crystalline phase and a normalized $H^+$ concentration below approximately 0.3.

19. The optical converter of claim 18 wherein the ferroelectric crystal is a crystal of lithium tantalate, lithium niobate, MgO doped lithium tantalate, MgO doped lithium niobate, ZnO doped lithium niobate or ZnO doped lithium tantalate.

20. The optical converter of claim 18 wherein the substrate is MgO doped lithium niobate, the width of each domain reversed region is a coherence length of between approximately 15 and 18 microns, and the converter efficiently converts incident radiation of approximately 1550 nanometers to radiation of approximately 775 nanometers.

21. The optical converter of claim 18 wherein the substrate is MgO doped lithium niobate, the width of each domain reversed region is a coherence length of between approximately 25 and 30 microns, and the converter converts incident radiation approximately 1064 nanometers and 1550 nanometers in DFG function to radiate an output signal with wavelength approximately 3393.4 nanometers.

22. The optical converter of claim 18 wherein the substrate is MgO doped lithium niobate, the width of each domain reversed region is a coherence length of between approximately 4 and 6 microns, and the converter converts incident radiation of approximately 980 nanometers to radiation of approximately 490 nanometers.

\* \* \* \* \*